(12) United States Patent
Ishii et al.

(10) Patent No.: US 12,583,511 B2
(45) Date of Patent: Mar. 24, 2026

(54) MOTOR DRIVE DEVICE

(71) Applicant: HITACHI ASTEMO, LTD.,
Hitachinaka (JP)

(72) Inventors: Akira Ishii, Hitachinaka (JP); Keiji Hamada, Hitachinaka (JP); Narutoshi Yamada, Hitachinaka (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 520 days.

(21) Appl. No.: 18/007,461

(22) PCT Filed: May 19, 2021

(86) PCT No.: PCT/JP2021/018941
§ 371 (c)(1),
(2) Date: Jan. 30, 2023

(87) PCT Pub. No.: WO2022/102146
PCT Pub. Date: May 19, 2022

(65) Prior Publication Data
US 2023/0271645 A1      Aug. 31, 2023

(30) Foreign Application Priority Data

Nov. 10, 2020      (JP) ................................. 2020-187192

(51) Int. Cl.
*B62D 5/04*          (2006.01)
*H02K 11/33*         (2016.01)
*H02P 25/16*         (2006.01)

(52) U.S. Cl.
CPC ......... *B62D 5/0463* (2013.01); *B62D 5/0421* (2013.01); *B62D 5/0484* (2013.01);
(Continued)

(58) Field of Classification Search
CPC .. B62D 5/0421; B62D 5/0463; B62D 5/0484; H02K 11/33
See application file for complete search history.

(56) References Cited

U.S. PATENT DOCUMENTS

| | | | |
|---|---|---|---|
| 10,050,493 B2 * | 8/2018 | Kabune | ................... H02K 9/00 |
| 2020/0029471 A1 * | 1/2020 | Sugiura | ............... B62D 5/0406 |
| 2020/0140004 A1 | 5/2020 | Matsuda et al. | |

FOREIGN PATENT DOCUMENTS

| | | | | | |
|---|---|---|---|---|---|
| CN | 105813921 A | * | 7/2016 | ............ | H02K 11/33 |
| CN | 107528428 A | * | 12/2017 | ............ | H02M 7/003 |

(Continued)

OTHER PUBLICATIONS

International Preliminary Report on Patentability dated May 25, 2023 issued in International Application No. PCT/JP2021/018941, with English translation, 12 pages.

(Continued)

*Primary Examiner* — William C Joyce
(74) *Attorney, Agent, or Firm* — FOLEY & LARDNER LLP

(57)          ABSTRACT

A motor drive device includes a first drive system in which a first power supply circuit and a first central processing unit are arranged in order in a first direction, and a second drive system in which a second power supply circuit and a second central processing unit are arranged in order in a second direction. The first direction and the second direction are opposite to each other. Calling a straight line passing between the first power supply circuit and the first central processing unit, perpendicular to the first direction, a first virtual line and calling a straight line passing between the second power supply circuit and the second central processing unit, perpendicular to the second direction, a second virtual line, the first central processing unit and the second (Continued)

central processing unit are disposed within an area sandwiched by the first virtual line and the second virtual line.

7 Claims, 7 Drawing Sheets

(52) U.S. Cl.
CPC ............ *H02K 11/33* (2016.01); *B62D 5/0406* (2013.01); *H02P 25/16* (2013.01)

(56) References Cited

FOREIGN PATENT DOCUMENTS

JP      2018-153070 A      9/2018
JP      2020-072621 A      5/2020

OTHER PUBLICATIONS

International Search Report dated Aug. 10, 2021 issued in International Application No. PCT/JP2021/018941, with English translation, 4 pages.

* cited by examiner

MOTOR DRIVE DEVICE

TECHNICAL FIELD

The present invention relates to a motor drive device for driving a motor having a first winding set and a second winding set.

BACKGROUND ART

Patent Document 1 discloses a motor drive device that controls driving of a motor by using a plurality of redundantly installed microcomputers. Specifically, this motor drive device includes a plurality of motor drive circuits, a plurality of microcomputers, and a plurality of clock generation circuits, and the plurality of motor drive circuits drive at least one motor having a plurality of winding sets.

REFERENCE DOCUMENT LIST

Patent Document

Patent Document 1: JP2018-153070A

SUMMARY OF THE INVENTION

Problem to be Solved by the Invention

There is a case in which a motor drive device has a redundant configuration in which a first drive system and a second drive system drive a motor, and each of the drive systems includes a component, e.g., a power supply circuit, which generates a large amount of heat (such a component will hereinafter be called a "heat-generating component"). In this case, if the heat-generating component in the first drive system and the heat-generating component in the second drive system are arranged side by side on a substrate, the two heat-generating components may generate an even greater amount of heat due to the thermal interference between these heat-generating components.

In addition, if the two heat-generating components in the two drive systems generate a greater amount of heat, and if the two drive systems consequently malfunction at the same time, the function of the motor drive device cannot be maintained by the redundant configuration.

To avoid arranging the heat-generating component in the first drive system and the heat-generating component in the second drive system side by side on the substrate, if the arrangement pattern of the plurality of circuit components that constitute the first drive system may be made different from the arrangement pattern of the plurality of circuit components that constitute the second drive system. However, in this case, a difference is caused in wiring resistance between the drive systems.

The present invention has been made in view of these conventional circumstances, and an object of the present invention is to provide a motor drive device that prevents occurrence of a difference in wiring resistance between drive systems and prevents heat generation amounts of heat-generating components in the individual drive systems from increasing due to mutual thermal interference.

Means for Solving the Problem

In an aspect of the present invention, there is provided a motor drive device for driving a motor having a first winding set and a second winding set. The motor drive device includes a first drive system that includes a first power supply circuit and a first central processing unit, and controls a current flow to the first winding set; and a second drive system that includes a second power supply circuit and a second central processing unit, and controls a current flow to the second winding set, the first drive system is constituted by arranging the first power supply circuit and the first central processing unit on a substrate in this order in a first direction, the second drive system is constituted by arranging the second power supply circuit and the second central processing unit on the substrate in this order in a second direction, the first direction and the second direction are set opposite to each other, and the arrangement of the first power supply circuit and the first central processing unit and the arrangement of the second power supply circuit and the second central processing unit are disposed side by side on the substrate, and calling a straight line that passes between the first power supply circuit and the first central processing unit in a plan view of the substrate, perpendicular to the first direction, a first virtual line, and calling a straight line that passes between the second power supply circuit and the second central processing unit in the plan view of the substrate, perpendicular to the second direction, a second virtual line, the first central processing unit and the second central processing unit are disposed within an area sandwiched by the first virtual line and the second virtual line.

Effects of the Invention

According to the present invention, it is possible to prevent occurrence of a difference in wiring resistance between drive systems, and to prevent heat generation amounts of heat-generating components in the individual drive systems from increasing due to mutual thermal interference.

MODE FOR CARRYING OUT THE INVENTION

Hereinafter, an example of a motor drive device according to the present invention will be described with reference to the drawings.

Figure 1:
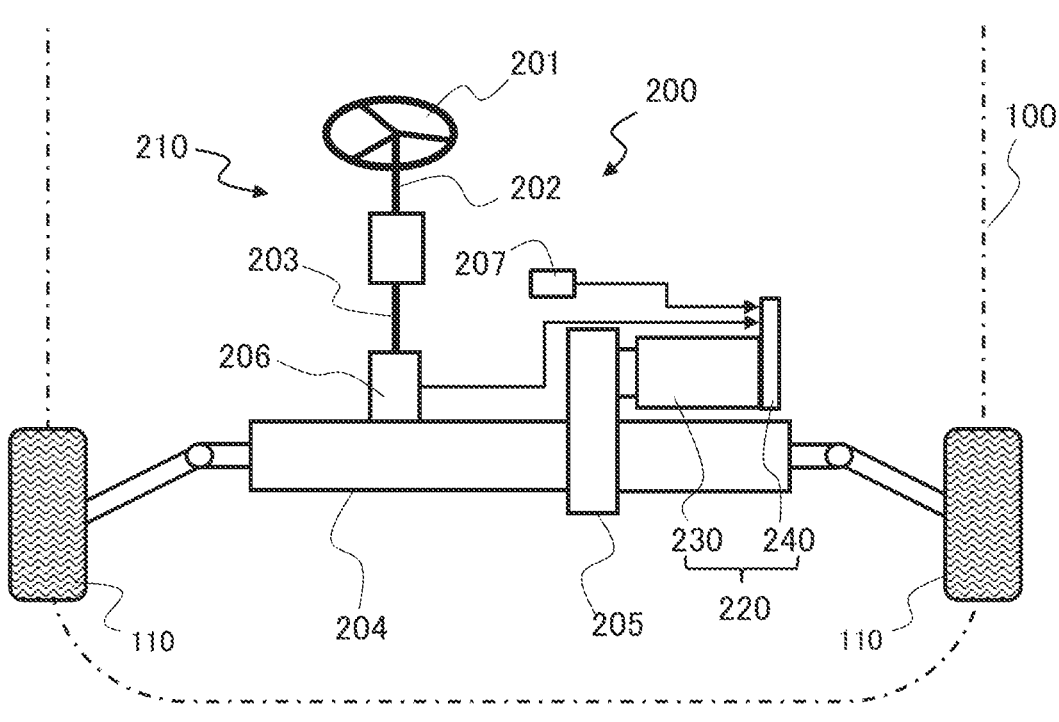
FIG. 1 illustrates a configuration of an electric power steering apparatus.

FIG. 1 illustrates a configuration of a mode of a vehicle electric power steering apparatus to which a motor drive device according to the present invention is applied.

It is clear that the application of the motor drive device according to the present invention is not limited to the vehicle electric power steering apparatus alone.

An electric power steering apparatus 200 includes a steering mechanism 210 for steering front wheels 110, which are steered road wheels of a vehicle 100, and a motor unit 220 for applying steering force to steering mechanism 210.

Motor unit 220 in electric power steering apparatus 200 applies the steering force to assist the steering force generated by a driver or to perform autonomous steering.

Motor unit 220 integrally includes a motor 230 and a motor drive device 240 that controls motor 230.

Motor 230 is, for example, a three-phase synchronous motor, and includes a first winding set and a second winding set, each of which has a U-phase coil, a V-phase coil, and a W-phase coil.

Motor drive device 240 has a redundant configuration constituted of a first drive system that controls a current flow to the first winding set of motor 230 and a second drive system that controls a current flow to the second winding set of motor 230.

As will be described in detail below, the first drive system includes a first central processing unit and a first power supply circuit that supplies power to the first central processing unit, etc., and the second drive system includes a second central processing unit and a second power supply circuit that supplies power to the second central processing unit, etc.

The first central processing unit is, in other words, a first microcomputer, and the second central processing unit is, in other words, a second microcomputer.

In addition, the first power supply circuit and the second power supply circuit are each an IC including a DC/DC converter, for example.

The first central processing unit and the second central processing unit each acquire various signals from the outside, calculate an operation amount for controlling the torque that is generated by motor 230 by performing arithmetic processing based on the acquired signals, and output a signal relating to the operation amount.

A plurality of circuit components including the first central processing unit and the first power supply circuit that constitute the first drive system and a plurality of circuit components including the second central processing unit and the second power supply circuit that constitute the second drive system are mounted on a single substrate.

Steering mechanism 210 includes a steering wheel 201, a steering shaft 202, a pinion shaft 203, and a rack shaft 204.

A deceleration mechanism 205 transmits the torque generated by motor 230 to rack shaft 204.

When the driver of vehicle 100 rotates steering wheel 201, steering mechanism 210 transmits the steering torque to pinion shaft 203 via steering shaft 202.

Next, steering mechanism 210 converts the rotational motion of pinion shaft 203 into the linear motion of rack shaft 204, so as to steer front wheels 110 coupled to the two ends of rack shaft 204.

A steering torque sensor 206 detects the steering torque of steering wheel 201.

When assisting the steering force generated by the driver, motor drive device 240 calculates a torque command value (in other words, a target value of the motor control), for example, based on a steering torque signal acquired from steering torque sensor 206 and a vehicle velocity signal acquired from a vehicle velocity sensor 207.

Next, based on the calculated torque command value, motor drive device 240 controls the current flows to the individual winding sets of motor 230 by performing pulse width modulation (PWM).

Figure 2:
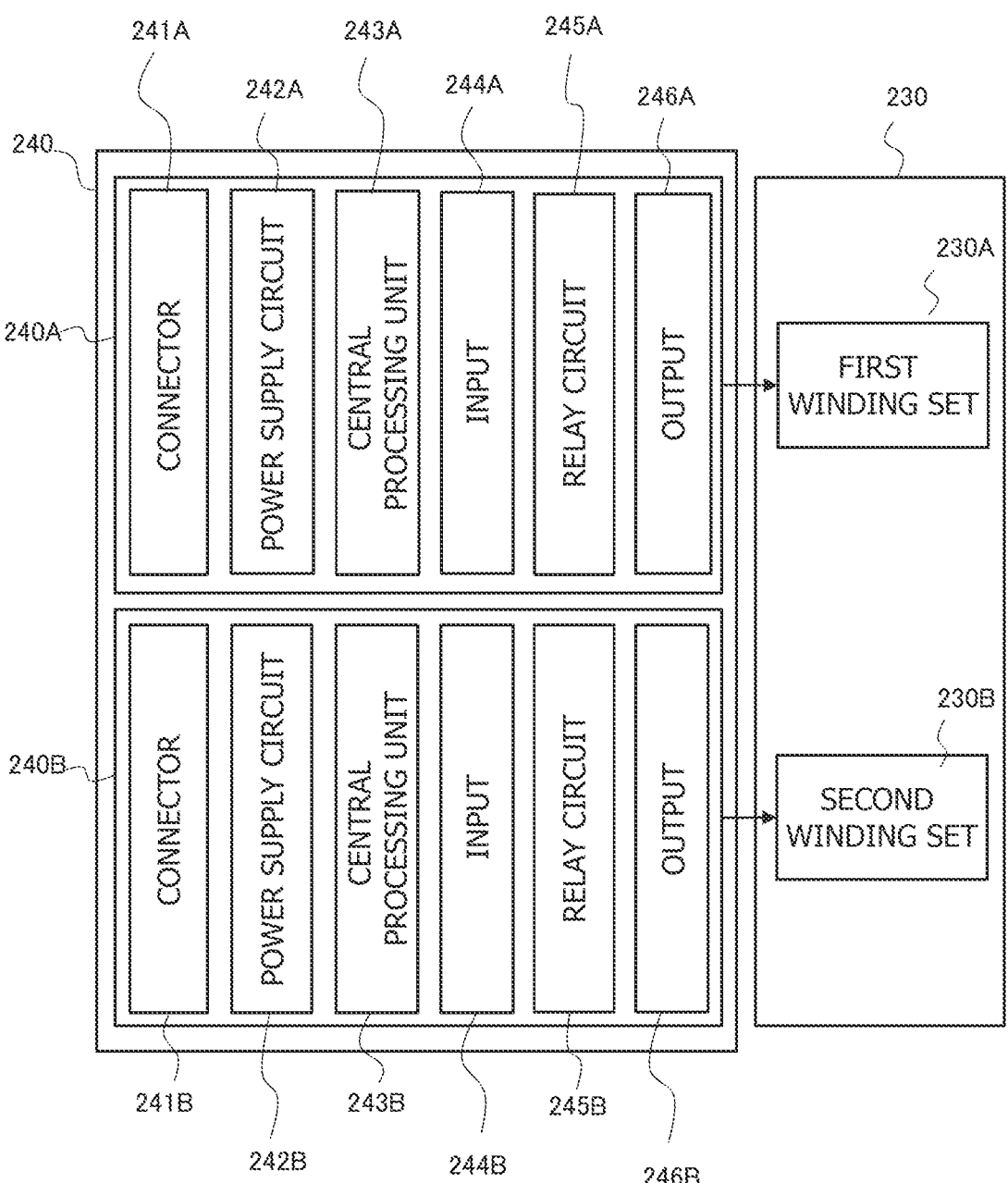
FIG. 2 is a block diagram illustrating a configuration of a motor drive device.

FIG. 2 is a block diagram illustrating a configuration of motor drive device 240.

Although FIG. 2 illustrates circuit components such as electronic components and connectors that constitute motor drive device 240, FIG. 2 does not illustrate arrangement of the circuit components on the substrate. Arrangement of the circuit components that constitute motor drive device 240 on the substrate will be described below.

Motor 230 includes a first winding set 230A and a second winding set 230B.

Motor drive device 240 includes a first drive system 240A that controls the current flow to first winding set 230A, and includes a second drive system 240B that controls the current flow to second winding set 230B.

That is, motor drive device 240 has a redundant configuration constituted of a plurality of systems, specifically, two systems.

First drive system 240A includes a first connector 241A, a first power supply circuit 242A, a first central processing unit 243A, a first input circuit 244A, a first power supply relay circuit 245A, and a first output circuit 246A.

Similarly, second drive system 240B includes a second connector 241B, a second power supply circuit 242B, a second central processing unit 243B, a second input circuit 244B, a second power supply relay circuit 245B, and a second output circuit 246B.

That is, first drive system 240A includes a first circuit component group constituted of a plurality of circuit components including first power supply circuit 242A as a heat-generating component, and second drive system 240B includes a second circuit component group constituted of a plurality of circuit components, which are equivalent to those of the first circuit component group.

Although the present description assumes that the first circuit component group of first drive system 240A and the second circuit component group of second drive system 240B are constituted of the same circuit components, the second circuit component group of second drive system 240B may be constituted of circuit components similar to those of the first circuit component group.

The circuit components that constitute first drive system 240A and second drive system 240B are not limited to connectors 241A and 241B, power supply circuits 242A and 242B, central processing units 243A and 243B, input circuits 244A and 244B, power supply relay circuits 245A and 245B, and output circuits 246A and 246B.

First drive system 240A includes at least first power supply circuit 242A and first central processing unit 243A, and second drive system 240B includes at least second power supply circuit 242B and second central processing unit 243B.

In addition, first central processing unit 243A and second central processing unit 243B may be configured to communicate with each other by connecting first central processing unit 243A and second central processing unit 243B via a communication line.

Figure 3:
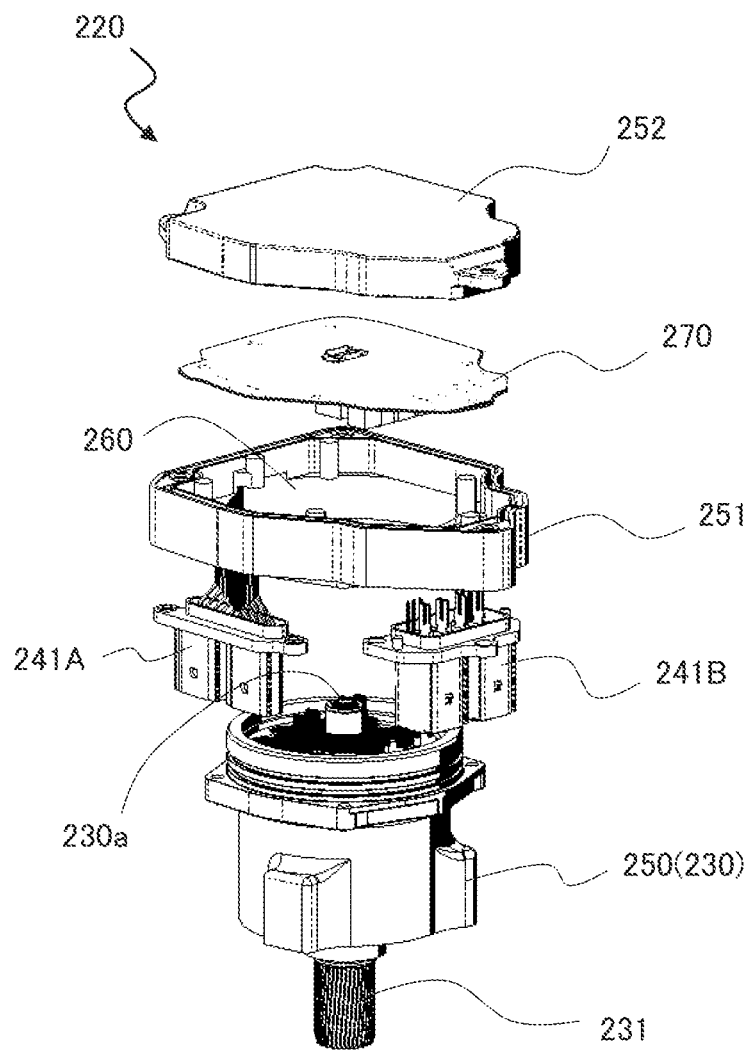
FIG. 3 is an exploded perspective view of a motor unit.

FIG. 3 is an exploded perspective view of motor unit 220.

Motor 230 is stored in a motor housing 250 such that an output part 231 of motor 230 protrudes from motor housing 250.

A substrate storage part 260 that is integral with motor 230 (specifically, motor housing 250) is formed along an extension direction of the output shaft of motor 230. Motor unit 220 includes substrate storage part 260, motor housing 250 storing motor 230, and output part 231, in this order, along the extension direction.

Substrate storage part 260 stores a substrate 270 on which circuit components such as various kinds of electronic components and connectors 241A and 241B that constitute motor drive device 240 are mounted.

Substrate storage part 260 (in other words, a substrate storage chamber) is formed by a frame 251 attached to an end part of motor housing 250 and a cover 252 attached to frame 251 such that an open end of frame 251 is covered.

In other words, the space surrounded by motor housing 250, frame 251, and cover 252 is substrate storage part 260.

In addition, substrate 270 is stored inside substrate storage part 260 such that the surface on which the circuit components that constitute motor drive device 240 are mounted is perpendicular to the shaft line of motor 230. Next, substrate 270 is fixed to frame 251 by using screws, for example.

Substrate 270 may be provided not only with circuit components that constitute motor drive device 240, but also a sensor module (not illustrated) that constitutes a magnetic angle sensor for detecting the rotation of motor 230.

If substrate 270 is provided with a sensor module (not illustrated) that constitutes a magnetic angle sensor, an end part 230*a* of the output shaft of motor 230 (in other words, an end part opposite output part 231) is formed to protrude from motor housing 250 into substrate storage part 260.

In addition, a magnet is attached to end part 230*a* protruding from motor housing 250, and the sensor module is installed on substrate 270 such that the sensor module faces this magnet.

Substrate 270 of motor unit 220 in FIG. 3 has a size such that at least a part of substrate 270 is outside the periphery of motor housing 250 in a plan view, and frame 251 and cover 252 are formed to store substrate 270.

Connectors 241A and 241B are each formed on a surface of a portion of substrate 270, the surface facing motor housing 250 and the portion being outside the periphery of motor housing 250 in a plan view, such that the fitting directions are parallel to the shaft line of motor 230.

That is, connectors 241A and 241B are disposed around motor housing 250 such that the insertion and removal directions are parallel to the shaft line of motor 230, and as male connectors (not illustrated) are moved in the direction from output part 231 of motor 230 to substrate storage part 260, the male connectors are connected to connectors 241A and 241B, which are female connectors.

Connectors 241A and 241B may be disposed on a surface of substrate 270, the surface facing cover 252, such that insertion and removal directions are parallel to the shaft line of motor 230, and as male connectors are moved in the direction from cover 252 to motor housing 250, the male connectors may be connected to connectors 241A and 241B.

As described above, motor drive device 240 includes first drive system 240A and second drive system 240B.

First drive system 240A includes first power supply circuit 242A, and second drive system 240B includes second power supply circuit 242B. First power supply circuit 242A and second power supply circuit 242B are heat-generating components.

If first power supply circuit 242A and second power supply circuit 242B are disposed adjacent each other on substrate 270, the mutual thermal interference increases heat generation amounts of first power supply circuit 242A and second power supply circuit 242B, and as a result, the two drive systems may malfunction at the same time.

For example, if the circuit components of drive systems 240A and 240B are disposed on substrate 270 as illustrated in FIG. 2, because the circuit components of drive systems 240A and 240B are arranged in the same order in the same direction, and because the arrangement of the circuit components of drive system 240A is placed adjacent (in other words, side by side with) the arrangement of the circuit components of drive system 240B, the same kind of circuit components, such as first power supply circuit 242A and second power supply circuit 242B, are disposed adjacent each other.

If drive systems 240A and 240B are arranged in this way, since the circuit components are linearly arranged in two columns side by side, the circuit components can be mounted efficiently on substrate 270. In addition, since the circuit components of drive systems 240A and 240B are arranged in the same pattern, occurrence of the difference in wiring resistance between drive systems 240A and 240B can be prevented.

However, since first power supply circuit 242A and second power supply circuit 242B, which are heat-generating components, are disposed adjacent each other on substrate 270, there is a concern that the mutual thermal interference may increase heat generation amounts of first power supply circuit 242A and second power supply circuit 242B.

To avoid this problem, motor drive device 240 adopts a different arrangement of the circuit components. In this arrangement, although the circuit components of first drive system 240A and the circuit components of second drive system 240B are arranged in the same pattern, first power supply circuit 242A and second power supply circuit 242B are not disposed adjacent each other. In other words, heat-generating components are not disposed adjacent each other.

Figure 4:
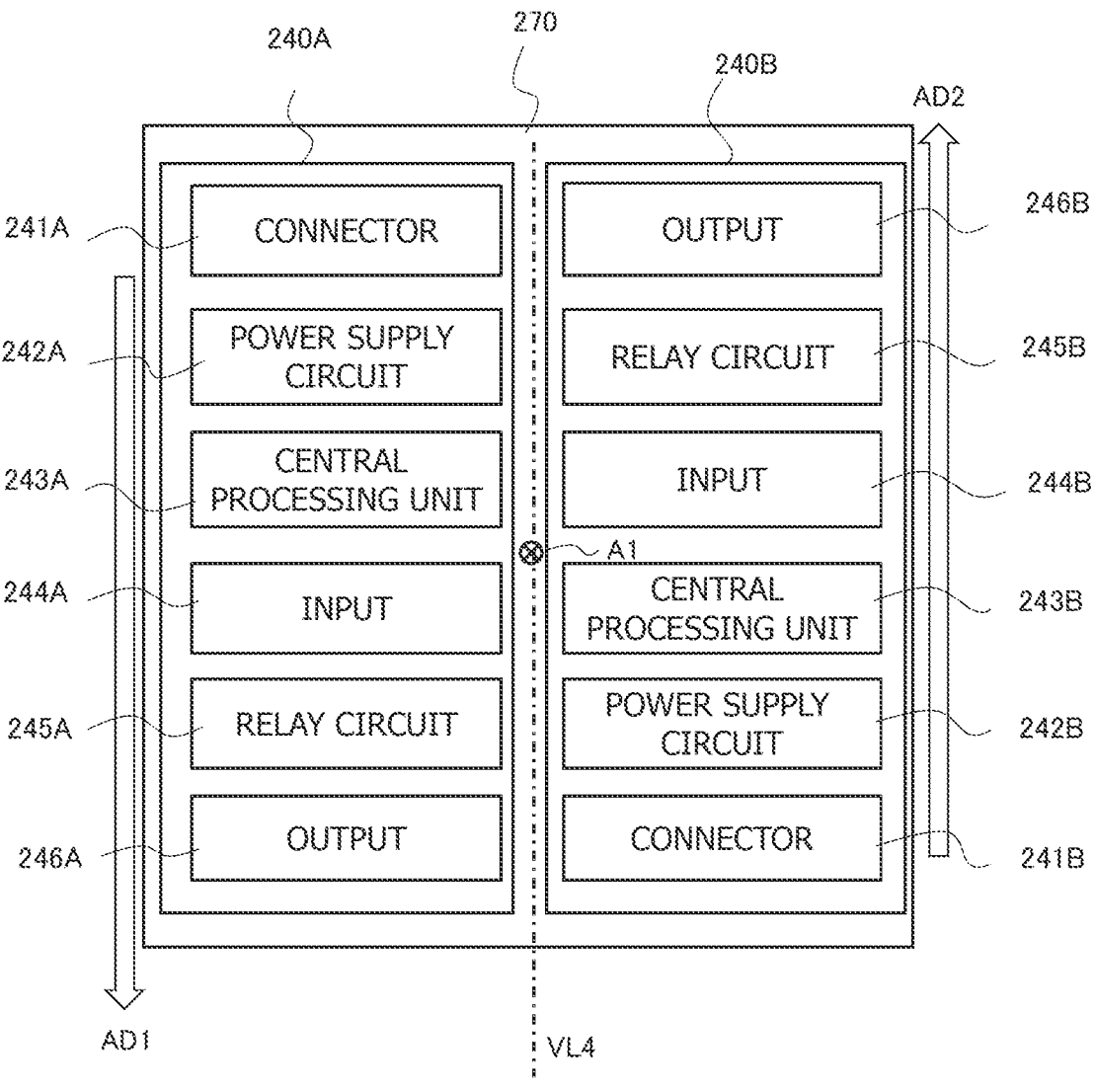
FIG. 4 schematically illustrates arrangement of circuit components that constitute the motor drive device.

FIG. 4 schematically illustrates arrangement of the circuit components on substrate 270. Specifically, FIG. 4 illustrates a mode of arrangement of the circuit components in which first power supply circuit 242A and second power supply circuit 242B are not disposed adjacent each other.

In the arrangement pattern in FIG. 4, first connector 241A, first power supply circuit 242A, first central processing unit 243A, first input circuit 244A, first power supply relay circuit 245A, and first output circuit 246A that constitute first drive system 240A are linearly arranged in this order in a first direction AD1.

Similarly, second connector 241B, second power supply circuit 242B, second central processing unit 243B, second input circuit 244B, second power supply relay circuit 245B, and second output circuit 246B that constitute second drive system 240B are linearly arranged in this order in a second direction AD2.

In addition, first direction AD1 and second direction AD2 are set opposite to each other, and the linear arrangement of the circuit components that constitute first drive system 240A and the linear arrangement of the circuit components that constitute second drive system 240B are disposed adjacent each other on substrate 270.

That is, the linear arrangement of the circuit components that constitute first drive system 240A is placed in first direction AD1 side by side with the linear arrangement of the circuit components that constitute second drive system 240B in second direction AD2 opposite first direction AD1.

In addition, on substrate 270, first connector 241A and second output circuit 246B are disposed adjacent each other, and first power supply circuit 242A and second power supply relay circuit 245B are disposed adjacent each other. In addition, first central processing unit 243A and second input circuit 244B are disposed adjacent each other, and first input circuit 244A and second central processing unit 243B are disposed adjacent each other. In addition, first power supply relay circuit 245A and second power supply circuit 242B are disposed adjacent each other, and first output circuit 246A and second connector 241B are disposed adjacent each other.

That is, with the arrangement of the circuit components in FIG. 4, first power supply circuit 242A and second power supply circuit 242B are not disposed adjacent each other.

When either one of the groups of circuit components is arranged in first direction AD1 or second direction AD2, the center of each of the packages of the circuit components does not need to be aligned linearly. Any one of the packages of the circuit components may be horizontally deviated from the first direction AD1 or second direction AD2.

In addition, the arrangement of the circuit components of first drive system 240A and the arrangement of the circuit components of second drive system 240B may be placed side by side, the former being disposed on one side of a fourth virtual line VL4 which is a straight line perpendicular to a shaft line A1 of the output shaft of motor 230 in a plan view of substrate 270, and the latter being disposed on the other side of fourth virtual line VL4.

With the arrangement of the circuit components illustrated in FIG. 4, first power supply circuit 242A and second power supply circuit 242B, which are heat-generating components, are not disposed adjacent each other. Thus, the increase in heat generation amount due to mutual thermal interference can be avoided.

In addition, with the arrangement of the circuit components illustrated in FIG. 4, the circuit components that constitute first drive system 240A and the circuit components that constitute second drive system 240B are arranged in the same pattern. Thus, occurrence of the difference in wiring resistance between drive systems 240A and 240B is avoided.

In addition, with the arrangement of the circuit components illustrated in FIG. 4, the linear arrangement of the first circuit component group that constitutes first drive system 240A and the linear arrangement of the second circuit component group that constitutes second drive system 240B are placed side by side on substrate 270. Because unnecessary space is not created on substrate 270 in this way, the circuit components can be mounted efficiently on substrate 270.

The following description will be made on arrangements in which first power supply circuit 242A and second power supply circuit 242B are not disposed adjacent each other, focusing on only power supply circuits 242A and 242B and central processing units 243A and 243B.

Figure 5:
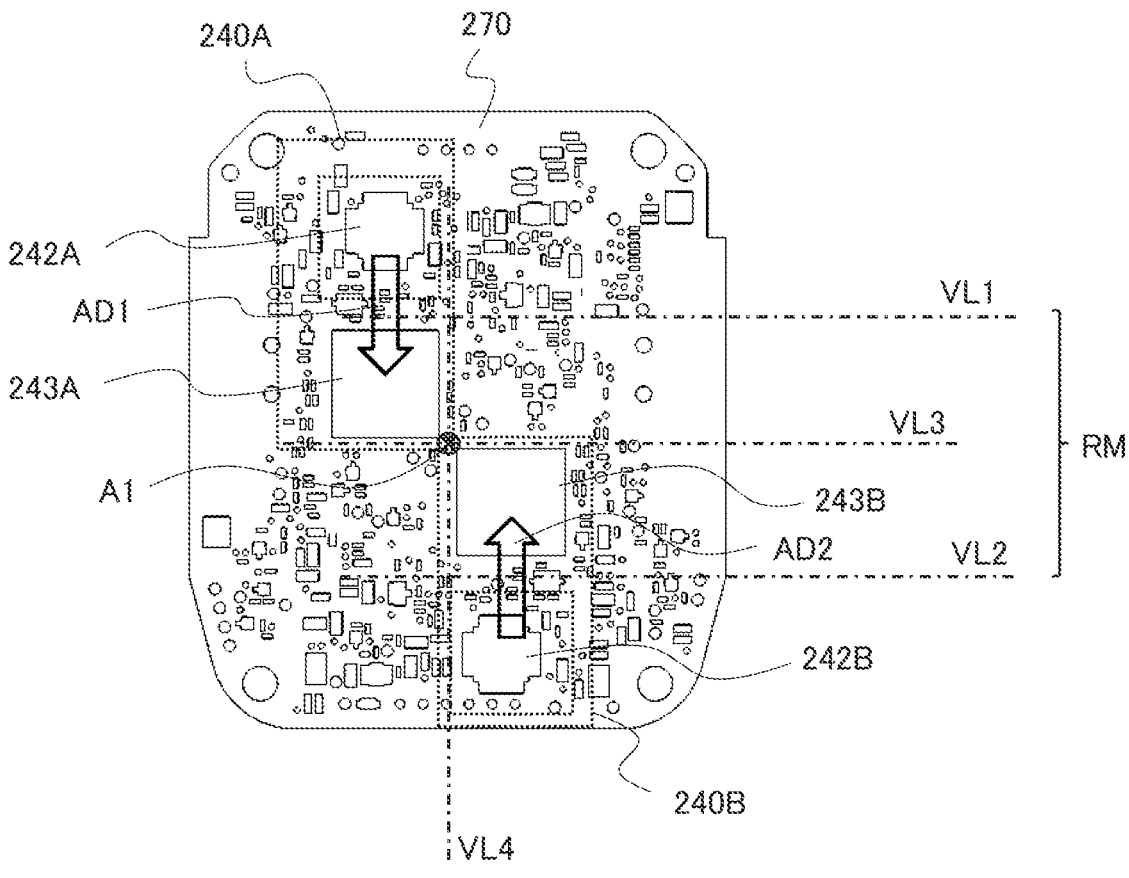
FIG. 5 is a plan view of a substrate illustrating a first mode of arrangement of a power supply circuit and a central processing unit.

FIG. 5 illustrates a mode of an arrangement pattern of power supply circuits 242A and 242B and central processing units 243A and 243B on substrate 270.

Herein, first power supply circuit 242A and first central processing unit 243A that constitute first drive system 240A are arranged in this order in first direction AD1, and second power supply circuit 242B and second central processing unit 243B that constitute second drive system 240B are arranged in this order in second direction AD2.

In addition, first direction AD1 and second direction AD2 are set opposite to each other, and the arrangement of first power supply circuit 242A and first central processing unit 243A and the arrangement of second power supply circuit 242B and second central processing unit 243B are placed side by side on substrate 270.

Hereinafter, a straight line that passes between first power supply circuit 242A and first central processing unit 243A in a plan view of substrate 270, perpendicular to first direction AD1, will be called a first virtual line VL1, and a line that passes between second power supply circuit 242B and second central processing unit 243B in a plan view of substrate 270, perpendicular to second direction AD2, will be called a second virtual line VL2.

First central processing unit 243A and second central processing unit 243B are disposed in a belt-like area RM sandwiched by first virtual line VL1 and second virtual line VL2.

In addition, within area RM, first central processing unit 243A is disposed on one side of third virtual line VL3 which is a straight line perpendicular to first direction AD1 and second direction AD2 in a plan view of substrate 270, and second central processing unit 243B is disposed on the other side of third virtual line VL3, such that first central processing unit 243A and second central processing unit 243B are not disposed adjacent each other.

In addition, the arrangement of first power supply circuit 242A and first central processing unit 243A may be disposed on one side of fourth virtual line VL4 which is a straight line perpendicular to shaft line A1 of the output shaft of motor 230 in a plan view of substrate 270, and the arrangement of second power supply circuit 242B and second central processing unit 243B may be disposed on the other side of fourth virtual line VL4, the arrangements being placed side by side.

By disposing power supply circuits 242A and 242B and central processing units 243A and 243B on substrate 270 as described above, as is the case with the arrangement in FIG. 4, first power supply circuit 242A and second power supply circuit 242B are not disposed adjacent each other, and first central processing unit 243A and second central processing unit 243B are not disposed adjacent each other.

First direction AD1 and second direction AD2 are set opposite to each other, and the arrangement of first power supply circuit 242A and first central processing unit 243A and the arrangement of second power supply circuit 242B and second central processing unit 243B are placed side by side on substrate 270, and first central processing unit 243A and second central processing unit 243B are disposed within area RM sandwiched by first virtual line VL1 and second virtual line VL2.

In this case, regardless of the location of power supply circuit 242A or 242B in the arrangement of the circuit components of the drive system 240A or 240B (in other words, the order), first power supply circuit 242A and second power supply circuit 242B are not disposed adjacent each other.

For example, if each of power supply circuits 242A and 242B is located in the center in the arrangement of the circuit components of the corresponding one of drive systems 240A and 240B, although first direction AD1 and second direction AD2 are set opposite to each other, first power supply circuit 242A and second power supply circuit 242B may be disposed adjacent each other.

However, arranging first central processing unit 243A and second central processing unit 243B within area RM results in arranging first power supply circuit 242A and second power supply circuit 242B outside area RM.

Thus, regardless of the locations of power supply circuits 242A and 242B in the arrangements of the circuit components of the drive systems 240A and 240B, first power supply circuit 242A and second power supply circuit 242B are not disposed adjacent each other.

When first direction AD1 and second direction AD2 are set opposite to each other, when the arrangement of first power supply circuit 242A and first central processing unit 243A and the arrangement of second power supply circuit 242B and second central processing unit 243B are placed side by side on substrate 270, and when first central processing unit 243A and second central processing unit 243B are disposed within area RM, if the drive systems 240A and 240B have the same arrangement pattern, there is no need to dispose all the circuit components of drive systems 240A and 240B linearly.

For example, circuit components other than power supply circuit 242A or 242B and central processing unit 243A or 243B may be deviated from the arrangement of power supply circuit 242A or 242B and central processing unit 243A or 243B or may be disposed separately in a plurality of columns.

Figure 6:
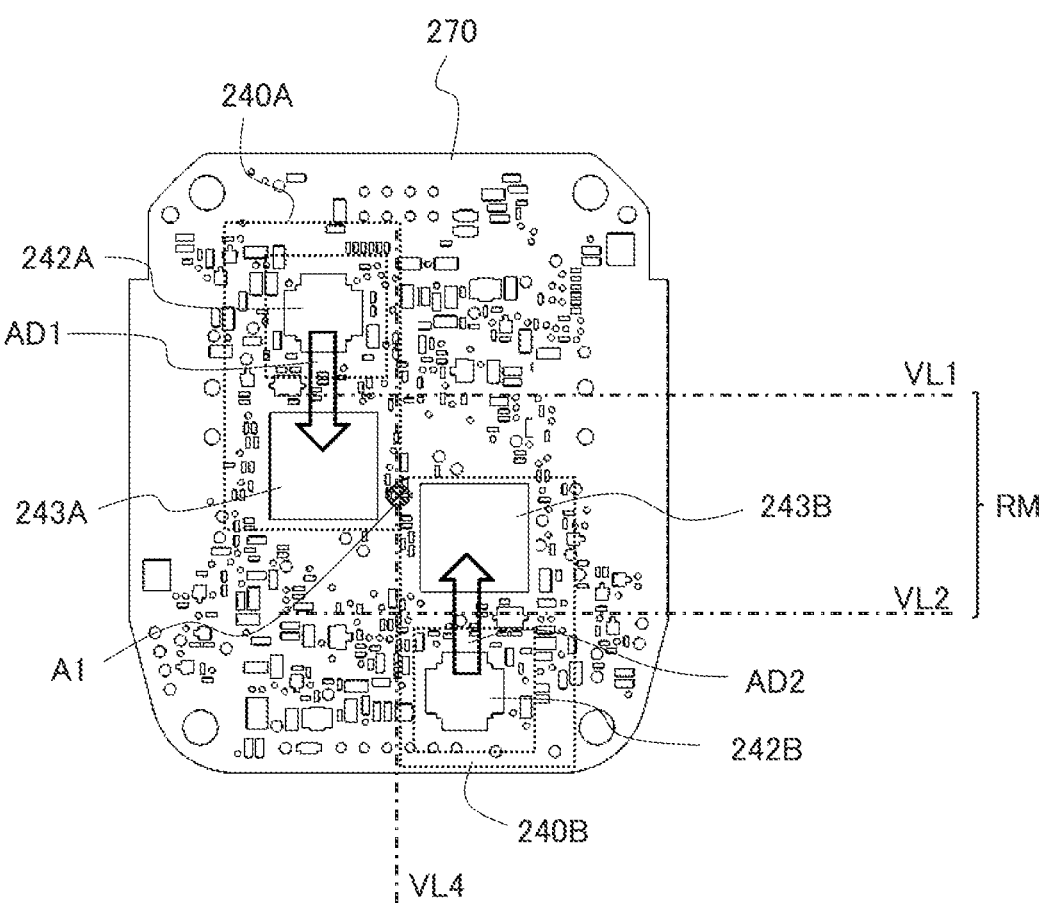
FIG. 6 is a plan view of a substrate illustrating a second mode of the arrangement of the power supply circuit and the central processing unit.
Figure 7:
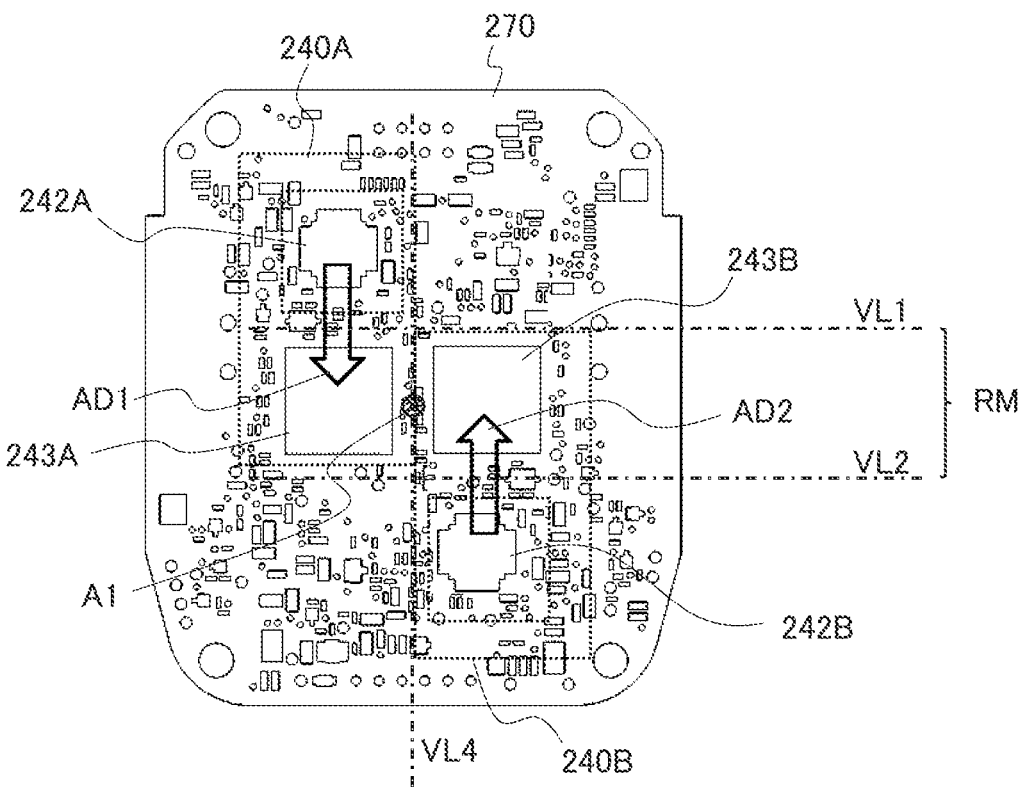
FIG. 7 is a plan view of a substrate illustrating a third mode of the arrangement of the power supply circuit and the central processing unit.

FIGS. 6 and 7 each illustrate a variation of the arrangement of first central processing unit 243A and second central processing unit 243B within area RM.

FIG. 6 illustrates an arrangement in which first central processing unit 243A and second central processing unit 243B are disposed within area RM such that part of first central processing unit 243A and part of second central processing unit 243B are adjacent each other.

FIG. 7 illustrates an arrangement in which first central processing unit 243A and second central processing unit 243B are disposed within area RM such that first central processing unit 243A and second central processing unit 243B are adjacent each other.

In either arrangement illustrated in FIG. 6 or 7, because first power supply circuit 242A and second power supply circuit 242B are disposed outside area RM in which first central processing unit 243A and second central processing unit 243B are disposed, first power supply circuit 242A and second power supply circuit 242B are not disposed adjacent each other.

That is, by disposing first central processing unit 243A and second central processing unit 243B in area RM sandwiched by first virtual line VL1 and second virtual line VL2, first power supply circuit 242A and second power supply circuit 242B are not disposed adjacent each other, whether or not first central processing unit 243A and second central processing unit 243B are adjacent each other within area RM.

Thus, whether to dispose first central processing unit 243A and second central processing unit 243B within area RM can be freely determined based on various conditions, such as a circuit component arrangement pattern and a relationship between the length of the arrangement of circuit components and the size of substrate 270.

The individual technical concepts described in the above example can be appropriately combined and used, as long as there is no conflict.

In addition, although the present invention has thus been described in detail with reference to a preferable example, it is apparent to those skilled in the art that various types of modifications are possible, based on the basic technical concepts and teachings of the present invention.

For example, substrate 270 may have a circular, rectangular, or square shape, and any of the circuit component arrangements according to the present invention is applicable to any of these cases.

In addition, the arrangement of first power supply circuit 242A and first central processing unit 243A and the arrangement of second power supply circuit 242B and second central processing unit 243B may be placed side by side at a location deviated from the center of substrate 270. That is, these arrangements may be placed side by side regardless of the location of fourth virtual line VL4.

In addition, substrate 270 may include a first rigid part, a second rigid part, and a flexible part between the first rigid part and the second rigid part. In this case, substrate 270 may be stored in substrate storage part 260 by warping and deforming the flexible part and overlapping the first rigid part and the second rigid part with each other.

In addition, the arrangement of first power supply circuit 242A and first central processing unit 243A and the arrangement of second power supply circuit 242B and second central processing unit 243B may be disposed in the first rigid part, and circuit components such as power supply relay circuits 245A and 245B and output circuits 246A and 246B may be disposed in the second rigid part.

If substrate 270 including the above flexible part is used, substrate 270 illustrated in any one of FIGS. 5 to 7 can be considered to be one of the first rigid part and the second rigid part.

REFERENCE SYMBOL LIST

230 motor
230A first winding set
230B second winding set
240 motor drive device
240A first drive system
240B second drive system
242A first power supply circuit
243A first central processing unit
242B second power supply circuit
243B second central processing unit
270 substrate
VL1 first virtual line
VL2 second virtual line

The invention claimed is:

1. A motor drive device for driving a motor having a first winding set and a second winding set, the motor drive device comprising:

a first drive system that includes a first power supply circuit and a first central processing unit, and controls a current flow to the first winding set; and a second drive system that includes a second power supply circuit and a second central processing unit, and controls a current flow to the second winding set, wherein the first drive system is constituted by arranging the first power supply circuit and the first central processing unit on a substrate in this order in a first direction, wherein the second drive system is constituted by arranging the second power supply circuit and the second central processing unit on the substrate in this order in a second direction, wherein the first direction and the second direction are set opposite to each other, and the arrangement of the first power supply circuit and the first central processing unit and the arrangement of the second power supply circuit and the second central processing unit are placed side by side on the substrate, and wherein, calling a straight line that passes between the first power supply circuit and the first central processing unit in a plan view of the substrate, perpendicular to the first direction, a first virtual line, and calling a straight line that passes between the second power supply circuit and the second central processing unit in the plan view of the substrate, perpendicular to the second direction, a second virtual line, the first central processing unit and the second central processing unit are disposed within an area sandwiched by the first virtual line and the second virtual line.

2. The motor drive device according to claim 1, wherein the first central processing unit and the second central processing unit are disposed within the area, the first central processing unit being disposed on one side of a third virtual line which is a straight line that is perpendicular to the first direction and the second direction in the plan view of the substrate, and the second central processing unit being disposed on another side of the third virtual line.

3. The motor drive device according to claim 1, wherein the first central processing unit and the second central processing unit are disposed adjacent each other within the area.

4. The motor drive device according to claim 1, wherein the first central processing unit and the second central processing unit are disposed within the area such that part of the first central processing unit and part of the second central processing unit are disposed adjacent each other.

5. The motor drive device according to claim 1, comprising a substrate storage part that is integral with the motor and located in an extension direction of an output shaft of the motor, wherein the substrate is stored in the substrate storage part such that a surface of the substrate, the surface on which the first power supply circuit and the first central processing unit are mounted, is perpendicular to a shaft line of the output shaft, wherein the arrangement of the first power supply circuit and the first central processing unit and the arrangement of the second power supply circuit and the second central processing unit are placed side by side, so that the arrangement of the first power supply circuit and the first central processing unit is disposed on one side of a section virtual line which is a straight line and is perpendicular to the shaft line in the plan view of the substrate, and the arrangement of the second power supply circuit and the second central processing unit is disposed on another side of the section virtual line.

6. The motor drive device according to claim 5, wherein the motor generates steering force in a vehicle electric power steering apparatus.

7. The motor drive device according to claim 1, wherein the first drive system includes a first connector, a first input circuit, a first power supply relay circuit, and a first output circuit, in addition to the first power supply circuit and the first central processing unit, wherein the second drive system includes a second connector, a second input circuit, a second power supply relay circuit, and a second output circuit, in addition to the second power supply circuit and the second central processing unit, wherein the first drive system is constituted by arranging the first connector, the first power supply circuit, the first central processing unit, the first input circuit, the first power supply relay circuit, and the first output circuit on the substrate in this order in the first direction, and wherein the second drive system is constituted by arranging the second connector, the second power supply circuit, the second central processing unit, the second input circuit, the second power supply relay circuit, and the second output circuit on the substrate in this order in the second direction.

* * * * *